(12) United States Patent
Koppens et al.

(10) Patent No.: US 10,677,649 B2
(45) Date of Patent: Jun. 9, 2020

(54) OPTOELECTRONIC APPARATUS, A METHOD FOR SUPPRESSING NOISE FOR AN OPTOELECTRONIC APPARATUS, AND USES THEREOF

(71) Applicants: FUNDACIÓ INSTITUT DE CIÈNCIES FOTÒNIQUES, Castelldefels (ES); INSTITUCIÓ CATALANA DE RECERCA I ESTUDIS AVANÇATS, Barcelona (ES)

(72) Inventors: Frank Koppens, Castelldefels (ES); Stijn Goossens, Castelldefels (ES); Gerasimos Konstantatos, Castelldefels (ES)

(73) Assignees: FUNDACIÓ INSTITUT DE CIÈNCIES FOTÒNIQUES, Castelldefels (ES); INSTITUCIÓ CATALANA DE RECERCA I ESTUDIS AVANÇATS, Barcelona (ES)

( * ) Notice: Subject to any disclaimer, the term of this patent is extended or adjusted under 35 U.S.C. 154(b) by 0 days.

(21) Appl. No.: 16/630,228

(22) PCT Filed: Jul. 11, 2018

(86) PCT No.: PCT/EP2018/068761
§ 371 (c)(1),
(2) Date: Jan. 10, 2020

(87) PCT Pub. No.: WO2019/011972
PCT Pub. Date: Jan. 17, 2019

(65) Prior Publication Data
US 2020/0132544 A1    Apr. 30, 2020

(30) Foreign Application Priority Data
Jul. 11, 2017  (EP) .................... 17382456

(51) Int. Cl.
*G01J 1/44*  (2006.01)
*H04N 5/357*  (2011.01)

(52) U.S. Cl.
CPC ............. *G01J 1/44* (2013.01); *H04N 5/357* (2013.01)

(58) Field of Classification Search
CPC ................................ G01J 1/44; H04N 5/357
See application file for complete search history.

(56) References Cited

U.S. PATENT DOCUMENTS

2013/0032782 A1*  2/2013  Gerasimos ............. B82Y 10/00
257/21
2016/0293834 A1  10/2016  Arup et al.
2019/0296178 A1*  9/2019  Bessonov ............... G01J 1/044

FOREIGN PATENT DOCUMENTS

EP          3 240 044 A1       11/2017

OTHER PUBLICATIONS

Fu et al., "Biosensing near the neutrality point of graphene," Science Advances, vol. 3. pp. 1-7 (2017).
(Continued)

*Primary Examiner* — Tony Ko
(74) *Attorney, Agent, or Firm* — Jenkins, Wilson, Taylor & Hunt, P.A.

(57) ABSTRACT

The present invention relates to an optoelectronic apparatus comprising: —an optoelectronic device comprising: —a transport structure (T) comprising a 2-dimensional layer; —a photosensitizing structure (P) configured and arranged to absorb incident light and induce changes in the electrical conductivity of the transport structure (T); and —drain (D) and source (S) electrodes electrically connected to respective separate locations of the transport structure (T); —noise suppression means comprising a modulation unit including: —a control unit to generate and apply on the drain (D) or source (S) electrodes a voltage oscillating signal having a
(Continued)

component with a frequency of $\omega_m/2\pi$; and —a signal extraction unit to extract a required electric signal, from an output signal, with no components below $\omega_m/2\pi$. The present invention also concerns to a method for suppressing noise for an optoelectronic apparatus according to the invention, and to the use of the apparatus as a light detector or as an image sensor.

20 Claims, 11 Drawing Sheets

(56) References Cited

OTHER PUBLICATIONS

Goossens et al., "Broadband image sensor array based on graphene-CMOS integration," Nature Photonics 11:366-371 (2017).
International Search Report corresponding to PCT/EP2018/068761 dated Oct. 9, 2018.
Konstantatos et al., "Hybrid graphene-quantum dot phototransistors with ultrahigh gain." Nature Nanotechnology 7:363-368 (2012).
Liu et al., "A graphene-based broadband optical modulator", Nature, vol. 474, pp. 64-67 (2011).
Written Opinion of the International Searching Authority corresponding to PCT/EP2018/068761 dated Jan. 17, 2019.

* cited by examiner

OPTOELECTRONIC APPARATUS, A METHOD FOR SUPPRESSING NOISE FOR AN OPTOELECTRONIC APPARATUS, AND USES THEREOF

FIELD OF THE INVENTION

The present invention relates, in a first aspect, to an optoelectronic apparatus, comprising noise suppression means with a modulation mechanism which operates on the optoelectronic device of the apparatus itself, doing without the use of external modulation mechanisms.

A second aspect of the present invention relates to a method for suppressing noise for an optoelectronic apparatus according to the first aspect of the invention.

A third aspect of the present invention concerns to the use of an optoelectronic apparatus according to the first aspect of the invention, as a light detector or as an image sensor.

BACKGROUND OF THE INVENTION

Optoelectronic apparatuses, such as photodetectors, which comprise the features of the preamble clause of claim 1 of the present invention are known in the art, i.e. those which comprise an optoelectronic device comprising:
- a transport structure comprising at least one 2-dimensional layer;
- a photosensitizing structure configured and arranged to absorb incident light and induce changes in the electrical conductivity of the transport structure; and
- drain and source electrodes electrically connected to respective separate locations of said transport structure.

Several noise sources negatively affect the performance of that kind of apparatuses, causing a high noise equivalent irradiance or noise equivalent power thereof, which makes them unable to detect low level of light levels.

In order to reduce said noise, it is known in the state of the art the integration of optoelectronic apparatuses into broader systems which already include external noise suppression means comprising modulation components which are external to the optoelectronic apparatus, generally formed by optical choppers and lock-in amplifiers.

The inclusion of said external modulation components has several drawbacks, such as, among others, an increase in the cost and size of the final product, an increase in the complexity of the control needed for its operation, as more components need to be controlled, and in a synchronized manner, an increase in power consumption, more thermal and electric losses, etc.

All of said drawbacks limit the possible applications for which said optoelectronic apparatuses can be used.

Also, the results achieved with said external noise suppressing means, in terms of noise reduction, can be improved.

Liu et al., "A graphene-based broadband optical modulator", Nature (2011), discloses a modulator (shutter) based in graphene, where, in contrast to the above mentioned types of optoelectronic apparatuses, light is absorbed in the 2-dimensional material, i.e. graphene, and which, among other differences to the above mentioned optoelectronic apparatus, limits their use as light detectors for light that does not impinge vertically, i.e. they cannot be used as image sensors.

It is, therefore, necessary to provide an alternative to the state of the art which covers the gaps found therein, by providing an optoelectronic apparatus including an optoelectronic device as described above (i.e. where the 2-dimensional layer is not used for absorbing light), but which does not possess the above mentioned drawbacks related to the need of using external noise suppressing means.

SUMMARY OF THE INVENTION

To that end, the present invention relates, in a first aspect, to an optoelectronic apparatus, comprising an optoelectronic device comprising, in a known manner:
- a transport structure comprising at least one 2-dimensional layer;
- a photosensitizing structure configured and arranged to absorb incident light and induce changes in the electrical conductivity of the transport structure; and
- drain and source electrodes electrically connected to respective separate locations of said transport structure.

In contrast to the apparatuses known in the prior art, the apparatus of the present invention further comprises, in a characterizing manner, noise suppression means comprising a modulation unit including:
- a control unit which includes a voltage generator and is configured to generate a voltage oscillating time-dependent signal having at least one component with a frequency of $\omega_m/2\pi$, i.e. $f_m$, and apply the same at least on one of the above mentioned drain and source electrodes; and
- a signal extraction unit configured to extract a required electric signal from an output electric signal generated at a channel created in the transport structure between the source and drain electrodes upon light impinges on the photosensitizing structure, said signal extraction unit being adapted to cut out at least those components of said output electric signal at frequencies below $\omega_m/2\pi$, i.e. $f_m$, to provide said required electric signal.

According to the present invention, it is preferred to use higher modulation frequencies $f_m$ because, as will be described below, 1/f noise is the main noise to be suppressed. Therefore, the noise suppression is stronger at a higher modulation frequency.

Appropriate values for $f_m$ are values above 50 Hz up to 100 MHz, for some embodiments.

For a preferred embodiment, the above mentioned dielectric structure comprises one or more dielectric layers, and/or the above mentioned photosensitizing structure comprises one or more photosensitizing layers.

In the context of the present invention, a photosensitizing structure configured and arranged to absorb incident light and induce changes in the electrical conductivity of the transport structure refers to the fact that light absorption in the photosensitizing structure results in a change in charge carrier density inside the transport structure.

This can for example be due to the following processes:
An electron (or a hole) from an electron-hole pair generated in the photosensitizing structure by the absorption of a photon can be transferred to the transport structure while the hole (or the electron) of said electron-hole pair remains trapped in the photosensitizing structure, or an interface between the photosensitizing structure and the transport structure, such as for instance in a dielectric structure disposed there between. In some embodiments, the photosensitizing structure is disposed above, such as for example directly above, the transport structure. Alternatively, in some other embodiments the photosensitizing structure is disposed below, such as for example directly below, the transport structure, so that a photon must cross the transport structure before reaching the photosensitizing structure where it will be absorbed.

Alternatively, light absorption in the photosensitizing structure leads to bound charges in the proximity of the surface of the photosensitizing structure. This draws charges into the 2-dimensional layer comprised by the transport structure, which changes its electrical conductivity.

In this sense, the heterojunction formed by the photosensitizing structure and the transport structure slows down recombination and makes it possible to collect several electric carriers for a single absorbed photon, which compounded with the high carrier mobility of the 2-dimensional material comprised in the transport structure, results in a very high photoconductive gain and responsivity.

In some embodiments, the photosensitizing structure comprises a photo-absorbing semiconductor, a 2D material, a polymer, a dye, quantum dots (such as for instance colloidal quantum dots), ferroelectrics, Perovskite and/or a combination thereof.

The photosensitizing structure may for example comprise nanocomposite films containing blends of the aforementioned materials. It may also be a single-layered structure or, alternatively, a multi-layered structure, in which one or more of the aforementioned materials constitute different layers stacked on each other.

In those embodiments in which the photosensitizing structure comprises quantum dots, these are preferably of one or more of the following types: Ag2S, Bi2S3, CdS, CdSe, CdHgTe, Cu2S, CIS (copper indium disulfide), CIGS (copper indium gallium selenide), CZTS (copper zinc tin sulfide), Ge, HgTe, InAs, InSb, ITO (indium tin oxide), PbS, PbSe, Si, SnO2, ZnO, and ZnS.

Similarly, in some embodiments the at least one 2-dimensional material comprised in the transport structure comprises one or more of the following materials: graphene, MoS2, MoSe2, WS2, WSe2, black phosphorus, SnS2, $Pb_5Sn_3Sb_2S_{14}$ (Franckeite) and h-BN (hexagonal boron nitride).

For some embodiments, at least for a first, second, and third embodiments which will be described in detail below (not for the fourth embodiment described below), the optoelectronic device further comprises a conductive first gate electrode structure, and a dielectric structure arranged between the conductive first gate electrode structure and the transport structure, and the control unit is configured to apply the above mentioned voltage oscillating time-dependent signal between the conductive first gate electrode structure and at least one of the drain and source electrodes, preferably the drain electrode.

For a preferred embodiment, said conductive first gate electrode structure is a conductive bottom gate electrode structure, although, alternatively, for a less preferred embodiment, the conductive first gate electrode structure is a conductive top gate electrode structure.

According to a first embodiment, the optoelectronic device further comprises a further electrode electrically connected to the photosensitizing structure, and the control unit is configured to generate a further voltage oscillating time-dependent signal having at least one component with a frequency of $\omega_m/2\pi$, i.e. $f_m$, and apply the same between the further electrode and one of the drain and source electrodes (preferably the drain electrode), simultaneously to the application of the voltage oscillating signal. The phase between the voltage oscillating time-dependent signal and the further voltage oscillating time-dependent signal can be controlled.

For a second embodiment, the optoelectronic device further comprises a further dielectric structure arranged over the photosensitizing structure, and a conductive second gate electrode structure arranged over the further dielectric structure, and the control unit is configured to generate a further voltage oscillating time-dependent signal having at least one component with a frequency of $\omega_m/2\pi$, i.e. $f_m$, and apply the same between the conductive second gate electrode structure and one of the drain and source electrodes (preferably the drain electrode), simultaneously to the application of the voltage oscillating time-dependent signal applied between the conductive first gate electrode structure and one of the drain and source electrodes (preferably the drain electrode). The phase between the voltage oscillating time-dependent signal and the further voltage oscillating time-dependent signal can be controlled.

For a preferred embodiment, said conductive second gate electrode structure is a conductive top gate electrode structure, although, alternatively, for a less preferred embodiment, the conductive second gate electrode structure is a conductive bottom gate electrode structure.

For some implementations of said first and second embodiments, the control unit is configured to generate the above mentioned voltage oscillating time-dependent signal and further voltage oscillating time-dependent signal to maintain substantially constant the charge carrier density of the channel created in the transport structure.

Preferably, the control unit is configured to generate the voltage oscillating time-dependent signal and further voltage oscillating time-dependent signal so that they oscillate between maximum and minimum voltage values selected by the control unit to achieve the above mentioned goal of maintaining substantially constant the charge carrier density of the channel created in the transport structure while tuning the responsivity of the optoelectronic device (for example, by tuning the quantum efficiency of the charge transfer from the photosensitizing structure to the transport structure) from a finite value (where generally the responsivity is maximum), at said maximum voltage values, to zero, at said minimum voltage values, and vice versa.

For a specific case of the first and second embodiments, the voltage oscillating signal and the further voltage oscillating signal are phase shifted up to 180°.

Embodiments for both of the above mentioned voltage oscillating time-dependent signal and the further voltage oscillating time-dependent signal cover any kind of periodic signals, such as a sinusoidal signal, a square pulse wave, a triangular wave, etc.

For a third embodiment, the at least one 2-dimensional layer is made of graphene, and the control unit is configured to generate the above mentioned voltage oscillating time-dependent signal so that it oscillates between maximum and minimum voltage values which are equal or substantially equal in magnitude but with opposed signs and selected by the control unit so that charge carrier density of the channel created in the transport structure is modulated around the charge neutrality point of the graphene, between maximum and minimum charge carrier density values ($+n_m$ and $-n_m$, where $n_m$ can be freely chosen), at a frequency of at least $\omega_m/2\pi$, i.e. $f_m$, and the electrical conductivity of the graphene layer is then modulated predominantly at a frequency $\omega_m/\pi$, i.e. $2f_m$, while a component at frequency $\omega_m/2\pi$, i.e. $f_m$, increases when light impinges on the photosensitizing structure.

For a slight variation of said third embodiment, when there is a carrier density offset in the channel created in the transport structure, the control unit is configured to generate the voltage oscillating time-dependent signal so that it oscillates between maximum and minimum voltage values which are equal or substantially equal in magnitude (i.e. peak amplitudes), with respect to a reference, but of the same sign.

Preferably, the maximum and minimum charge carrier density values are of opposite signs.

The absolute values of the maximum and minimum charge carrier density values are equal or substantially equal in magnitude, for an implementation of said third embodiment and of said slight variation thereof.

For a more elaborate implementation of said third embodiment and of said slight variation thereof, the optoelectronic device further comprises:
- a further electrode electrically connected to the photosensitizing structure; or
- a further dielectric structure arranged over the photosensitizing structure, and a conductive second gate electrode structure arranged over the further dielectric structure.

For said more elaborate implementation of the third embodiment and of said slight variation thereof, the control unit is configured to generate and apply a further voltage signal to the further electrode or second gate electrode structure, simultaneously to the application of the voltage oscillating time-dependent signal, so that the responsivity of the optoelectronic device is maintained constant and above zero, preferably at a maximum or substantially maximum value.

In order to compensate dependencies of the responsivity of the optoelectronic device on the voltage oscillating time-dependent signal or other voltages applied to the conductive first gate electrode structure, for a variant of said more elaborate implementation of the third embodiment and of said slight variation thereof, the control unit further comprises a compensation mechanism for compensating said dependencies, said compensation mechanism comprising a compensating voltage source configured to generate and apply a compensating voltage to the further electrode or second gate electrode structure.

The above described third embodiment and slight variation thereof can be used for noise suppression not only for an opto-electronic apparatus, but also for non opto-electronic apparatuses comprising graphene based sensing devices that rely on a source drain bias to be applied to the device. Any graphene based sensing device that relies on sensing a change in conductance will be limited by 1/f noise. However, this 1/f noise can be reduced by implementing the scheme described above in the third embodiment as long as the apparatus contains at least the following elements:
- a conductive bottom gate electrode structure;
- a dielectric structure/layer De arranged over the conductive bottom gate electrode structure;
- a transport structure comprising one or more 2-dimensional graphene layers arranged over the dielectric structure De;
- drain and source electrodes electrically connected to respective separate locations of the transport structure.

Graphene based sensing devices that rely sensing a change in conductance can be divided in three categories: pure graphene, modified graphene and functionalized graphene.

In the present document, pure graphene refers to a continuous sheet of (polycrystalline or monocrystalline) monolayer graphene that can be patterned in different ways to realize the following sensors:
Strain sensors: by stretching the graphene its conductance is modified.

Charge sensors: for example for sensing absorbed gas molecules or sensing neuronal signals, the analyte of interest transfers charge to the graphene or induces and electric field that modifies the conductance of the graphene. Another application is for direct sensing of in vivo electrical signals.

Pressure sensors: graphene is placed between two volumes and deforms when there is a pressure difference between the two regions; this deformation induces a change in conductance.

In the present document, modified graphene refers to a sheet of graphene that is structurally or chemically modified to realize the following sensors:
Strain sensors: by stretching the graphene its conductance is modified.

Temperature sensors: a difference in temperature induces a change in conductance.

Biosensors using chemically bonded linker molecules that enhance the selectivity for specific bio-molecules. When the molecule of interest binds to the linker, it transfer charge to the graphene or induces an electric in the graphene. This modifies the conductance of the graphene.

In the present document, functionalized graphene refers to a continuous sheet of (polycrystalline or monocrystalline) graphene that is functionalized with a physisorbed layer that sensitizes the graphene to one of the following analytes:
Light: using for example colloidal quantum dots in the opto-electronic device as referred to in other embodiments in this document.

Biomolecules with physisorbed linker molecules. When the molecule of interest binds to the linker, it transfers charge to the graphene or induces an electric in the graphene. This modifies the conductance of the graphene.

The above described non-optoelectronic apparatus constitutes a further independent aspect which could form another invention.

The present invention also comprises a fourth embodiment, wherein the control unit is configured to apply the voltage oscillating time-dependent signal between the source and drain electrodes, and to generate the same so that it oscillates between a higher value at which responsivity of the optoelectronic device is zero or substantially zero, and a lower value (i.e., lower than said higher value) at which responsivity of the optoelectronic device is maximal or substantially maximal. In other words, for the fourth embodiment noise suppression is performed by modulating the source drain bias.

For said fourth embodiment, the at least one 2-dimensional layer is generally made of graphene, although other alternative 2-dimensional materials can also be used such as $MoS_2$, $MoSe_2$, $WS_2$, $WSe_2$, black phosphorus, $SnS_2$ and $Pb_5Sn_3Sb_2S_{14}$ (Franckeite)

For an implementation of said fourth embodiment, the control unit is configured to generate the voltage oscillating signal to maintain substantially constant the charge carrier density of the channel created in the transport structure.

For an implementation of any of the above described embodiments, the signal extraction unit is adapted to also cut out those components of the output electric signal at frequencies above $\omega_m/2\pi$.

Preferably, the optoelectronic apparatus of the first aspect of the present invention comprises a photosignal extraction unit, in addition to or implemented by the signal extraction unit, adapted to extract the magnitude of the photosignal from the required electric signal.

For some embodiments, the different structures of the device of the apparatus of the first aspect of the invention are arranged (stacked one on another) on (over or under) a substrate comprised by the device.

For an embodiment, said substrate is made of a semiconductor material, such as Silicon.

For an embodiment, said substrate is a flexible and/or transparent substrate.

A second aspect of the present invention relates to a method for suppressing noise for an optoelectronic apparatus according to the first aspect of the invention, comprising performing the operations of the above described control unit, including calculating the above mentioned voltage oscillating time-dependent signal, or voltage oscillating time-dependent signal and further voltage time-dependent oscillating signal, and the application thereof on the respective electrodes and/or gate electrode structures of the optoelectronic device, and the operations of the above mentioned signal extraction unit to extract the required electric signal from the output electric signal.

For an embodiment, the method of the second aspect of the present invention further comprises performing the operations of the above indicated photosignal extraction unit, for any of the embodiments associated thereto described in the present document.

A third aspect of the present invention concerns to the use of an optoelectronic apparatus according to the first aspect of the invention, as a light detector or as an image sensor.

The applications of the present invention are in the broad photodetection field. Any photodetector based on a transport structure comprising 2D materials and a photosensitizing structure configured and arranged to absorb incident light and induce changes in the electrical conductivity of the transport structure benefits from the present invention, as they enable detection of lower light levels, reducing the noise equivalent irradiance or noise equivalent power of the detector or sensors.

The present invention can be used to implement light detectors for light that impinges vertically, including image sensors (linear or 2d arrays).

Moreover, the present invention can also be used for distance sensing applications, for example in the form of a photoelectric receiver arranged to detect light reflected on or radiated by an object.

Other applications of the present invention include ambient light sensing, LIDAR (Light Detection and Ranging o Laser Imaging Detection and Ranging) systems, and single pixel photodetectors.

BRIEF DESCRIPTION OF THE FIGURES

In the following some preferred embodiments of the invention will be described with reference to the enclosed figures. They are provided only for illustration purposes without however limiting the scope of the invention.

DESCRIPTION OF THE PREFERRED EMBODIMENTS

In the following, the above identified as first, second, third, and fourth embodiments are respectively called embodiments 1, 2, 3, and 4, and will be described with reference to the attached drawings.

The type of noise to be suppressed by the present invention is 1/f noise. As stated in prior art publications (Konstantatos et al., Nature Nanotechnology 2012, Goossens et al., Nature Photonics 2017) the devices of the prior art that are structurally as the one of the present invention, but without the noise suppressing means, are limited by 1/f noise.

Figure 16:
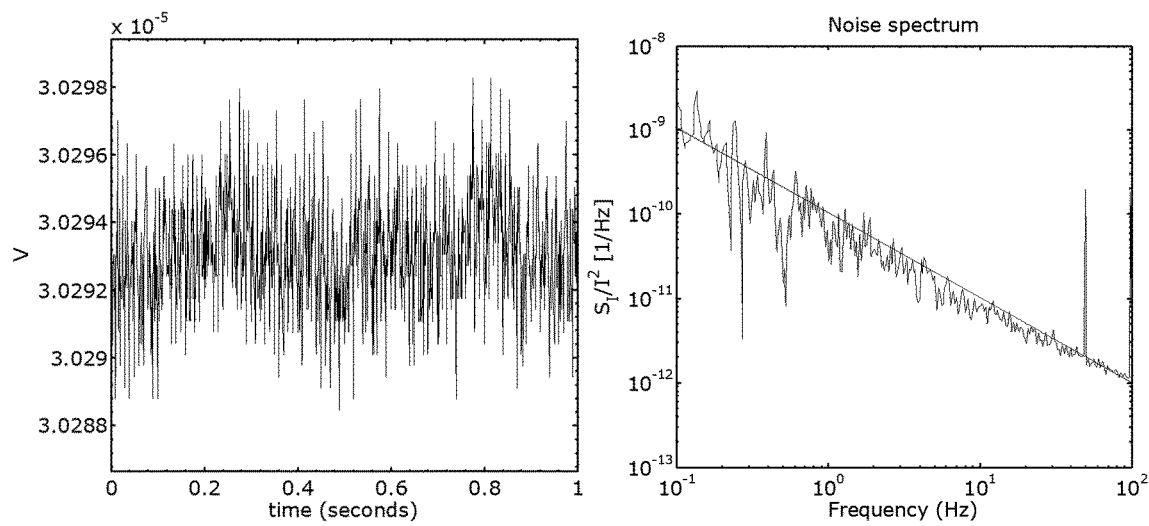
FIG. 16 shows the type of noise to be suppressed by the present invention, by means of two plots obtained performing a measurement using the conventional read-out on a graphene-quantum dot hybrid detector, using a conventional read-out, for an optoelectronic apparatus including any of the device structures shown in FIGS. 1, 5, 6 and 11, but without the noise suppression means of the present invention. Plot (a) shows a time trace of the signal obtained under dark conditions, while plot (b) shows the obtained noise spectrum.

That type of noise is illustrated in FIG. 16, for a prototype, where, in plot (b), the straight tilted line has a slope of 1/f, showing that 1/f or flicker noise dominates the noise of the optoelectronic apparatus. The peak at 50 Hz is an interference caused by the measurement setup.

Embodiment 1: Electronic Shutter Implemented Via Bottom Gate and Top Contact Modulation For this embodiment, the optoelectronic device of the optoelectronic apparatus of the first aspect of the present invention has the arrangement depicted by FIG. 1(a), i.e. a substrate Sb, and arranged thereon:
- a conductive bottom gate electrode structure Gb;
- a dielectric structure/layer De arranged over the conductive bottom gate electrode structure Gb;
- a transport structure T comprising one or more 2-dimensional layers arranged over the dielectric structure De;
- a photosensitizing structure/layer P (semiconducting light absorber) and arranged over the transport structure T and configured and arranged to absorb incident light and induce changes in the electrical conductivity of the transport structure T;
- a top electrode Et electrically connected (ohmic contact or Schottky contact) to the photosensitizing structure P; and
- drain D and source S electrodes electrically connected to respective separate locations of the transport structure T.

FIG. 1(b) illustrates the optoelectronic apparatus including the device of FIG. 1(a) and an electronic connection scheme, including voltage generators $V_{BD}$, $V_{TD}$, and $V_{SD}$, of the control unit (not shown) included in the modulation unit of the noise suppression means of the present invention.

Figure 1:
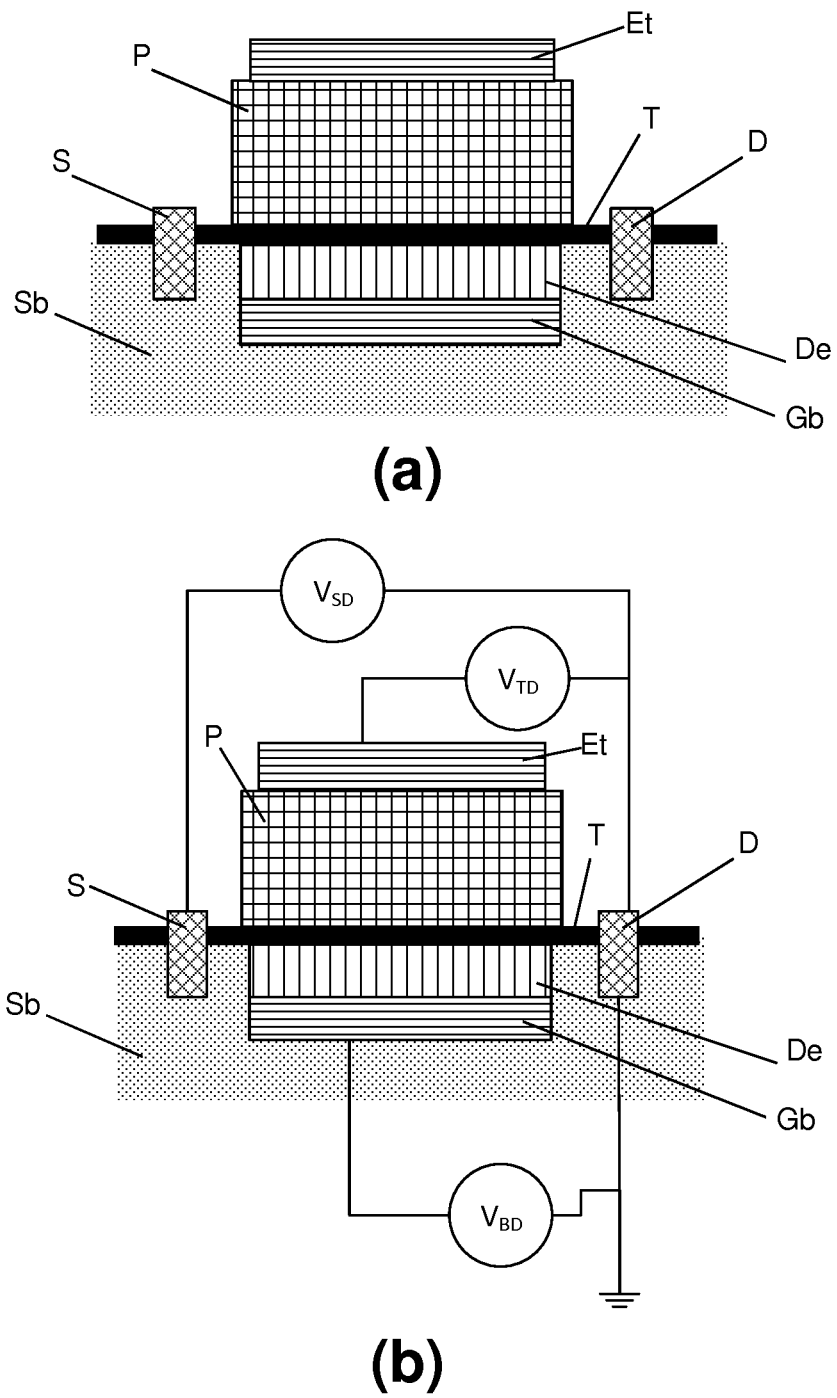
FIG. 1 shows a first embodiment of the optoelectronic apparatus of the first aspect of the present invention, by means of a view (a) of a schematic cross-sectional view of the device of the apparatus, and a view (b) of the apparatus including the device and an electronic connection scheme.
Figure 2:
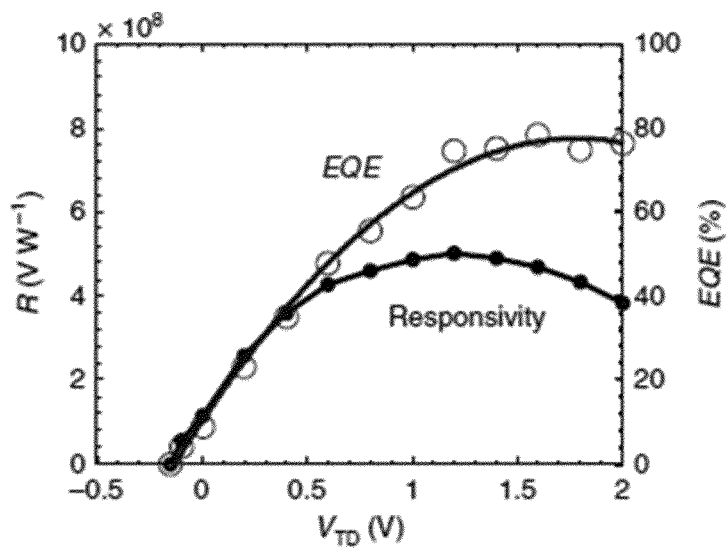
FIG. 2 is a plot showing how the quantum efficiency can be tuned with $V_{TD}$ (Nikitskiy et al, 2016).

The quantum efficiency of the device illustrated in FIG. 1(a) can be tuned from 0 to substantially 80% using the top electrode voltage $V_{TD}$ which is illustrated in FIG. 2, where EQE refers to External Quantum Efficiency, and R to responsivity.

The charge carrier density $n_g$, and hence the resistance of the channel of the 2D material (i.e. of transport structure T) $R_{ch}$ can be tuned with both top electrode and bottom gate:

Top electrode: $n_{ch}=C_T*V_{TD}/q_e$

Bottom gate: $n_{ch}=C_B*V_{BD}/q_e$

Where $C_T$ and $C_B$ refer respectively to the capacitances of the top electrode Et and the bottom gate electrode Gb to the transport structure T, $n_{ch}$ to the average carrier density in the 2D material channel and $q_e$ to the electrical charge in the channel of the transport structure T.

For the combination of voltages $V_{TD,2}$, $V_{TD,1}$, $V_{BD,2}$ and $V_{BD,1}$ that is described by the following relation, the carrier density and hence $R_{ch}$ is constant:

$$C_T/C_B=(V_{TD,2}-V_{TD,1})/(V_{BD,2}-V_{BD,1}) \quad (1)$$

Figure 3:
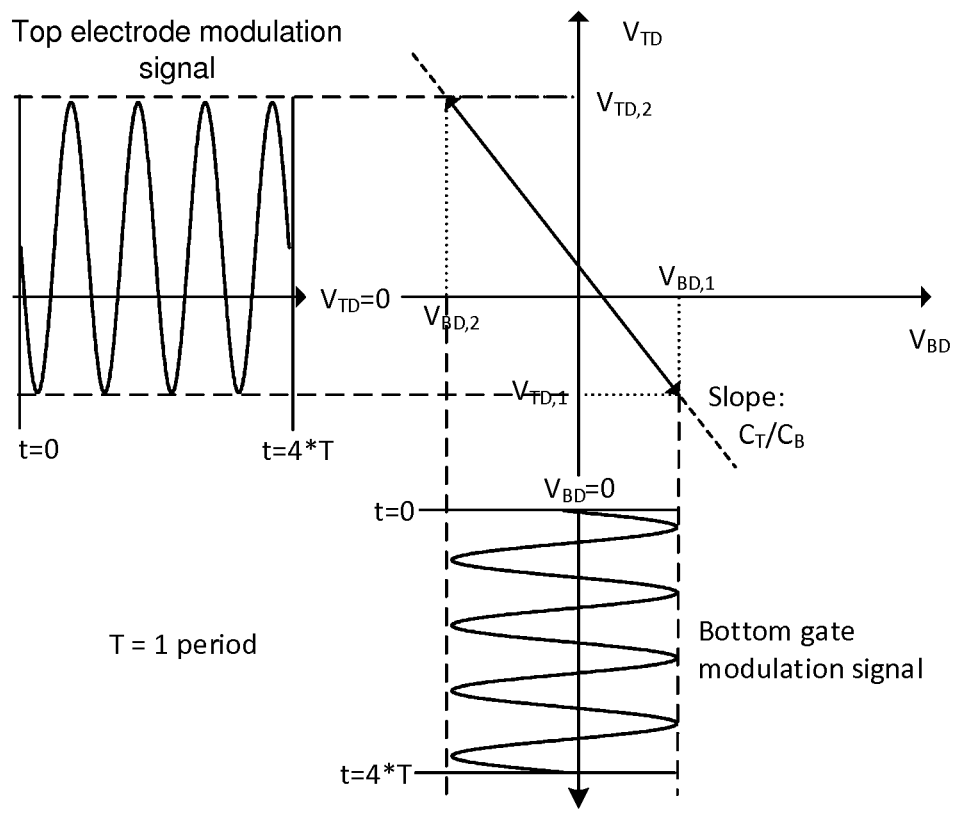
FIG. 3 is a schematic diagram of the modulation scheme proposed for the first embodiment of FIG. 1.

Now, assuming that at $V_{TD}=V_{TD,1}$ the quantum efficiency is 0, and at $V_{TD}=V_{TD,2}$ and $V_{BD}=V_{BD,2}$ the quantum efficiency is maximum, by setting $V_{BD}$ to $V_{BD,1}$ given by equation (1) switching between operation points $V_{TD,2}$, $V_{BD,2}$ and $V_{TD,1}$, $V_{BD,1}$ can be done, to modulate the sensitivity of the device while keeping the resistance of the 2D material constant. This modulation is illustrated in FIG. 3.

To implement said modulation respective oscillating signals need to be applied to the top electrode Et and bottom gate electrode Gb, for example sinusoidal signals (or any other periodic signal square pulse, triangular wave, etc. . . . ):

Top electrode: $V_{TD}=V_{TD,1}+0.5*abs\ (V_{TD,2}-V_{TD,1})*(\sin(\omega_m*t+\pi+\varphi)+1)$ Bottom gate: $V_{BD}=VB_{D,1}+0.5*abs\ (V_{BD,2}-V_{BD,1})*(\sin(\omega_m*t+\varphi)-1)$ Now, the light signal should appear at a frequency $\omega_m$.

Said oscillating signals $V_{TD}$, $V_{BD}$, called in a previous section as voltage oscillation signal and further voltage oscillation signal respectively, are generated by the voltage generators of the control unit of the present invention.

The modulation unit of the apparatus of the first aspect of the invention includes a signal extraction unit configured to extract a required electric signal from an output electric signal generated at a channel created in the transport structure T between the source S and drain D electrodes upon light impinges on the photosensitizing structure P, i.e. to implement the read-out of said output electric signal.

Said signal extraction unit is adapted to cut out at least those components of the output signal at frequencies below $\omega_m/2\pi$ to provide the required output signal. This can be implemented in different ways:

Lock-in amplifier.

High pass filter with $f_c<\omega_m/2\pi$ (phase information lost).

Band pass filter with $f_{c1}<\omega_m/2\pi$ and $f_{c2}>\omega_m/2\pi$ (phase information lost).

Post-processing fast Fourier transform, implemented in hardware or software (phase information lost).

Figure 4:
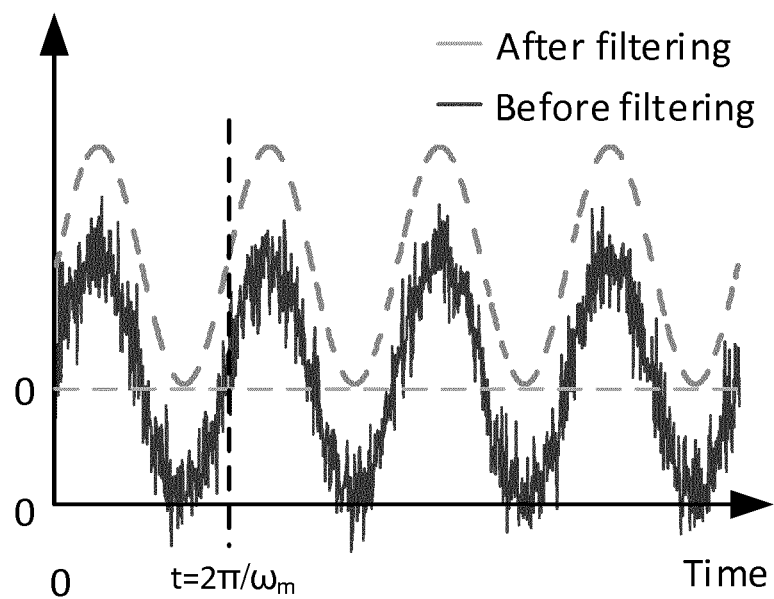
FIG. 4 is a plot schematically showing the detection results obtained for the first embodiment of FIG. 1, showing in solid line the resulting signal when the device is illuminated with a constant light signal and a top electrode and bottom gate modulation as described below is implemented. In dashed the resulting detection signal after band pass filtering is plot; the signal is offset for clarity.

FIG. 4 shows the detection results obtained for Embodiment 1, showing in solid line the resulting detection signal when the device of FIG. 1 is illuminated with a constant light signal and a top electrode and bottom gate modulation as described above is implemented. In dashed, the resulting detection signal after band pass filtering is plot; the signal is offset for clarity. Although not shown in FIG. 4, for clarity sake, the resulting detection signal also includes noise at frequencies below $f_m$. The band pass filtering filters both the illustrated noise above $f_m$ and the non-illustrated noise below $f_m$.

Embodiment 2: Electronic Shutter Implemented Via Bottom Pate and Top Pate Modulation For this embodiment 2, the optoelectronic device of the optoelectronic apparatus of the first aspect of the present invention has the arrangement depicted by FIG. 5, i.e. one which differs from the one of FIG. 1 in that, instead of including a top electrode, it includes a top gate Gt isolated from the photosensitizing structure P by a further dielectric structure Def.

Figure 5:
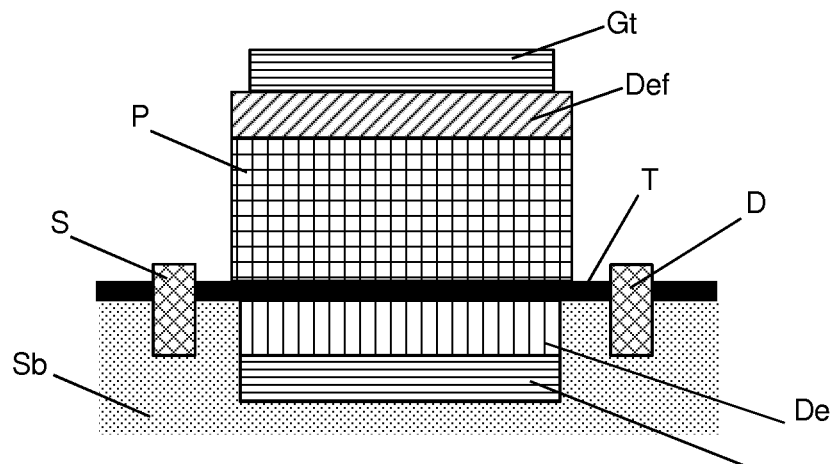
FIG. 5 is a schematic cross-sectional view of the optoelectronic device of the apparatus of the first aspect of the present invention, for a second embodiment.

The optoelectronic apparatus of Embodiment 2 includes the device of FIG. 5 and an electronic connection scheme as illustrated in FIG. 1(b), i.e. including voltage generators $V_{BD}$, $V_{TD}$, and $V_{SD}$ of the control unit (not shown) included in the modulation unit of the noise suppression means of the present invention, but where the voltage generator $V_{TD}$ is connected to the top gate Gt (instead of to a top electrode Et).

On the same grounds as described in Embodiment 1, modulation is implemented using respective oscillating signals (voltage oscillation signal $V_{TD}$ and further voltage oscillation signal $V_{BD}$) to be applied to the top gate Gt and bottom gate electrode Gb, for example sinusoidal signals (or any other periodic signal square pulse, triangular wave, etc. . . . ):

Top gate: $V_{TD}=V_{TD,1}+0.5*abs(V_{TD,2}-V_{TD,1})*(sin(\omega_m*t+\pi+\varphi)+1)$ Bottom gate: $V_{BD}=V_{BD,1}+0.5*abs(V_{BD,2}-V_{BD,1})*(sin(\omega_m*t+\varphi)-1)$ Now, the light signal should appear at a frequency $\omega_m$.

The read-out and signal extraction can be implemented in the same way as in Embodiment 1, i.e. by means of the signal extraction unit (not shown) of the modulation unit of the apparatus of the first aspect of the invention, providing results similar to the ones shown in FIG. 4, when a band pass filtering is applied.

Embodiment 3: Noise Suppression Using Bottom Date Modulation

Figure 6:
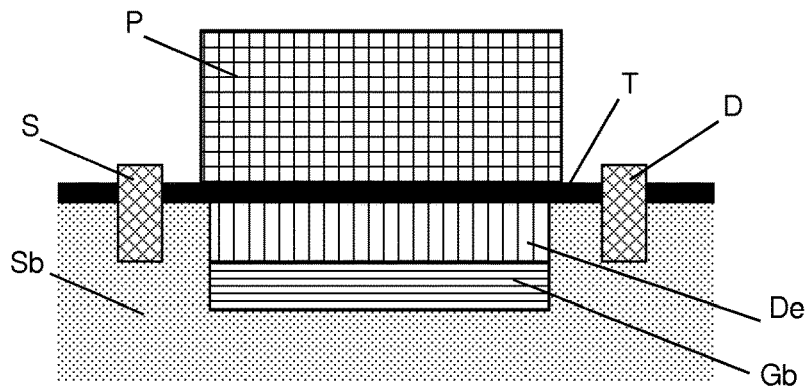
FIG. 6 is a schematic cross-sectional view of the optoelectronic device of the apparatus of the first aspect of the present invention according to an arrangement which can be used for a third and fourth embodiments.

For this embodiment, the optoelectronic device of the optoelectronic apparatus of the first aspect of the present invention has the arrangement depicted by FIG. 6, i.e. a substrate Sb, and arranged thereon:
- a conductive bottom gate electrode structure Gb;
- a dielectric structure/layer De arranged over the conductive bottom gate electrode structure Gb;
- a transport structure T comprising one or more 2-dimensional graphene layers arranged over the dielectric structure De;
- a photosensitizing structure/layer P (semiconducting light absorber) arranged over the transport structure T and configured and arranged to absorb incident light and induce changes in the electrical conductivity of the transport structure T; and
- drain D and source S electrodes electrically connected to respective separate locations of the transport structure T.

In this case, the present invention benefits specifically from the ambipolar conduction nature of the graphene.

The conductivity of the graphene channel of the transport structure T is described by:

$$\sigma=\sqrt{n^{*2}+n_{ch}^2}\cdot e\cdot\mu$$

Where n* is the residual carrier density of the graphene, $n_{ch}$ the average carrier density in the graphene channel, e the electron charge and µ the mobility of the graphene. When the bottom gate electrode Gb is modulated, one can write the following for $n_{ch}$:

$$n_{ch}=C_B\cdot V_m\cdot\sin\omega_m t$$

This modulation (see FIG. 7) leads to a modulation of σ, but due to the non-linear relation between sigma and $n_{ch}$, this modulation in σ occurs at frequency $2\omega_m$.

Now, considering the case where light is impinging the device, this induces a constant carrier density in the graphene channel $n_{light}$, and then the conductivity of the channel is:

$$\sigma=\sqrt{n^{*2}+(n_{ch}+n_{light})^2}\cdot e\cdot\mu$$

The conductivity will now also contain the frequency $\omega_m$, with a magnitude (in the frequency domain) proportional to the light induced density $n_{light}$.

When a signal extraction that cuts out the signals around frequencies smaller and larger than $\omega_m$ is implemented, a suppression of the noise has been achieved.

The reason for this suppression is that an effective quasi-static illumination leads to a signal at a higher frequency, where the device noise (often dominated by 1/f noise) is lower. The source of the 1/f noise can be either charge density, mobility or contact noise. The noise suppression scheme in Embodiment 3 functions best when the noise is dominated by mobility noise.

Hence, for Embodiment 3, the control unit (not shown) is configured to generate a voltage oscillating signal $V_{BD}$ (connected as $V_{BD}$ in FIG. 1(b), i.e. between the bottom gate electrode Gb and the drain electrode D) so that it oscillates between maximum $V_{BDmax}$ (or $V_{BD,1}$) and minimum $V_{BDmin}$ (or $V_{BD,2}$) voltage values which are equal or substantially in magnitude but with opposed signs, or with the same sign when there is a carrier density offset in the channel created in the transport structure, and selected by the control unit so that charge carrier density $n_{ch}$ of the graphene channel is modulated between maximum $n_{ch}*$ and minimum $-n_{ch}*$ charge carrier density values (residual charge carrier density values or values of other type of charge carrier density) at a frequency $\omega_m/2\pi$, and the conductivity σ of the graphene layer is modulated at a frequency $\omega_m/\pi$ and contains a component at a frequency $\omega_m/2\pi$ when light impinges on the photosensitizing structure P.

Figure 7:
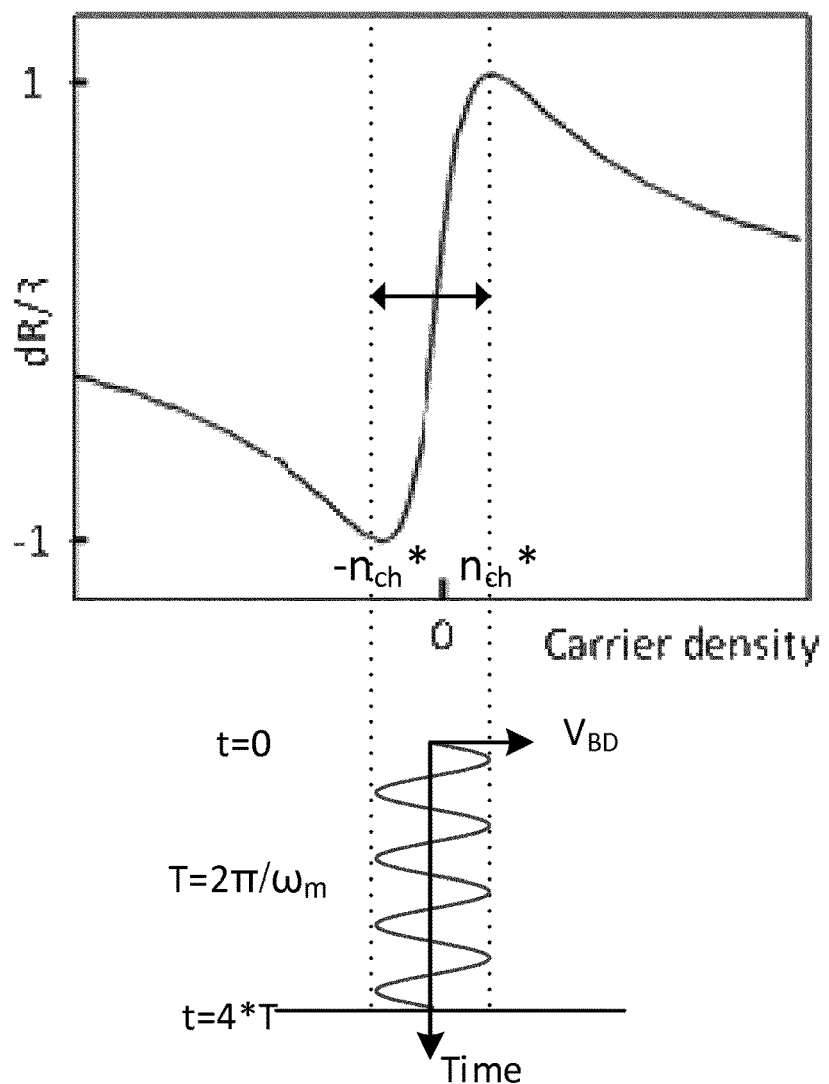
FIG. 7 is a schematic diagram of the modulation scheme proposed for the third embodiment, together with a plot of the photosignal dR/R as a function of the carrier density in the graphene layer of the device, where the depicted arrow indicates the range over which the carrier density needs to be modulated to achieve noise suppression for the third embodiment.

Preferably, as shown in FIG. 7, the maximum and minimum charge carrier density values are of opposite signs and equal or substantially equal in magnitude.

The read-out and signal extraction can be implemented in the same way as in Embodiment 1, i.e. by means of the signal extraction unit (not shown) of the modulation unit of the apparatus of the first aspect of the invention.

FIG. 7 shows both, the voltage oscillating signal $V_{BD}$ used for Embodiment 3, and also a plot of the photosignal dR/R obtained with the device of FIG. 6, as a function of the carrier density in the graphene layer T of the device, where the depicted arrow indicates the typical range over which the carrier density needs to be modulated to achieve noise suppression for the third embodiment.

Figure 8:
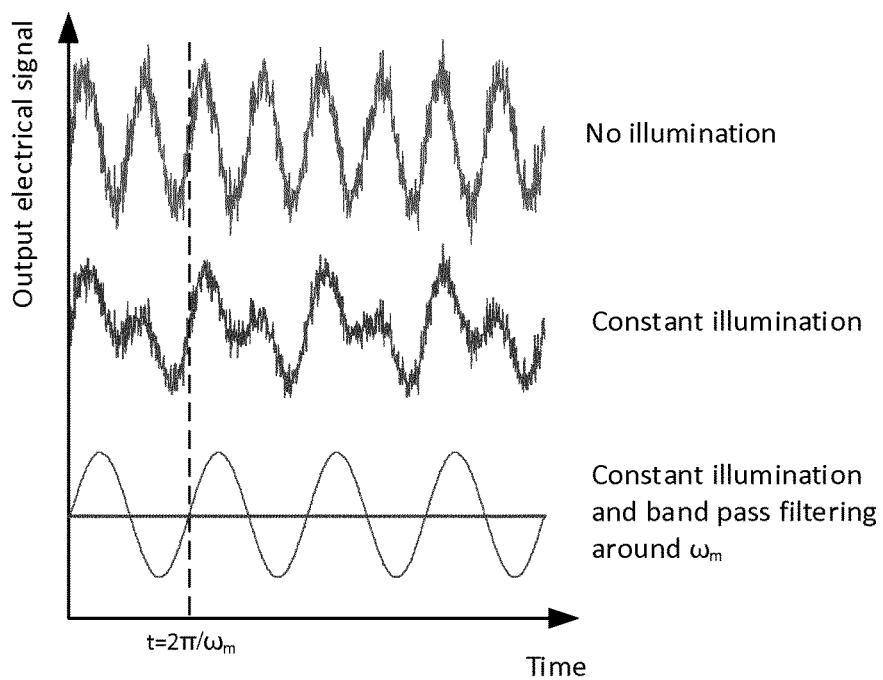
FIG. 8 schematically shows different graphical representations of the device output waveforms obtained with the apparatus of the third embodiment, upon modulation of the bottom gate as will be described below. The upper plot shows the output signal without light, the intermediate one the output signal with constant illumination and the lower plot shows the output signal with constant illumination after band pass filtering.
Figure 9:
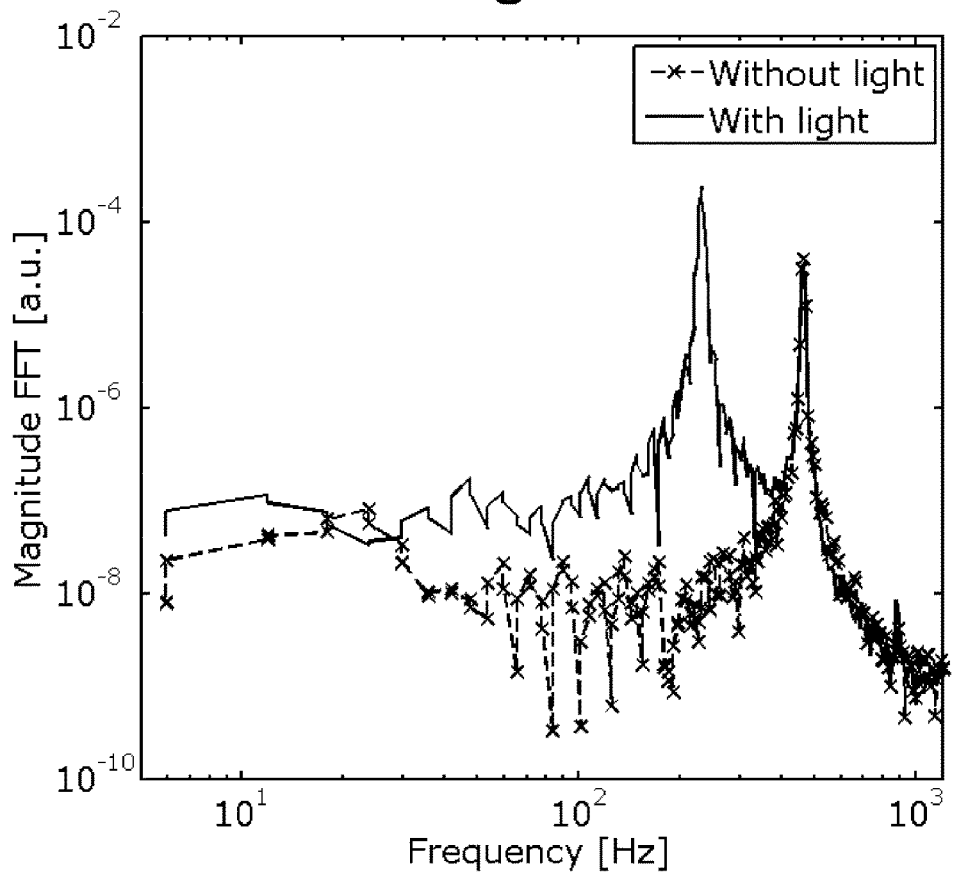
FIG. 9 is a plot showing the results obtained for a practical implementation of the apparatus of the present invention, for the third embodiment, relating the magnitude FFT of the output detection signal with modulation frequency.

A schematic and a practical implementation of the noise suppression scheme of this Embodiment 3 is illustrated with waveforms in FIG. 8 (schematic) and in FIG. 9 (realistic practical implementation).

Particularly, FIG. 8 shows different schematic graphical representations of the device output waveforms upon modulation of the bottom gate electrode Gb as described above, and FIG. 9 shows the results obtained for a practical implementation of the apparatus of the present invention, modulated at a frequency of f=225 Hz. Due to non-linear effects a peak appears at 2*f ("Without light" line). Illumination with constant light causes a peak at f to appear ("With light" line).

Likewise in FIG. 4, in FIG. 8, for clarity sake, the resulting detection signal also includes noise at frequencies below $f_m$. The band pass filtering filters both the illustrated noise above $f_m$ and the non-illustrated noise below $f_m$.

Although not shown, for a more elaborated implementation of this Embodiment 3, the optoelectronic device further comprises a top electrode electrically connected to the photosensitizing structure P or a conductive top gate electrode structure separated from the photosensitizing structure P by a further dielectric structure (i.e. as shown in FIG. 5), in order to perform the maintaining of the responsivity of the optoelectronic device constant and above zero and/or to generate and apply a compensating voltage to the top electrode or top gate electrode structure, as already explained in a previous section.

As stated in a previous section of the present document, Embodiment 3 can be used for noise suppression not only for an opto-electronic apparatus, but also for non optoelectronic apparatuses comprising non-optoelectronic graphene based sensing devices that rely on a source drain bias to be applied to the device.

Figure 15:
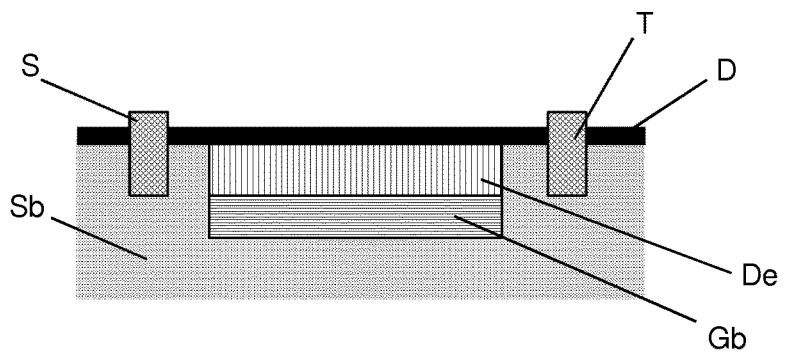
FIG. 15 is a schematic cross-sectional view of a non-optoelectronic device of a non-optoelectronic apparatus viable for implementing the noise suppression scheme of embodiment 3.

An embodiment of such a non-optoelectronic graphene based device is shown in FIG. 15, and comprises:
a conductive bottom gate electrode structure Gb;
a dielectric structure/layer De arranged over the conductive bottom gate electrode structure Gb;
a transport structure T comprising one or more 2-dimensional graphene layers arranged over the dielectric structure De; and
drain D and source S electrodes electrically connected to respective separate locations of the transport structure T.

The noise suppression scheme of Embodiment 3 described for the device shown in FIG. 6 also works for the device of FIG. 15.

Figure 17:
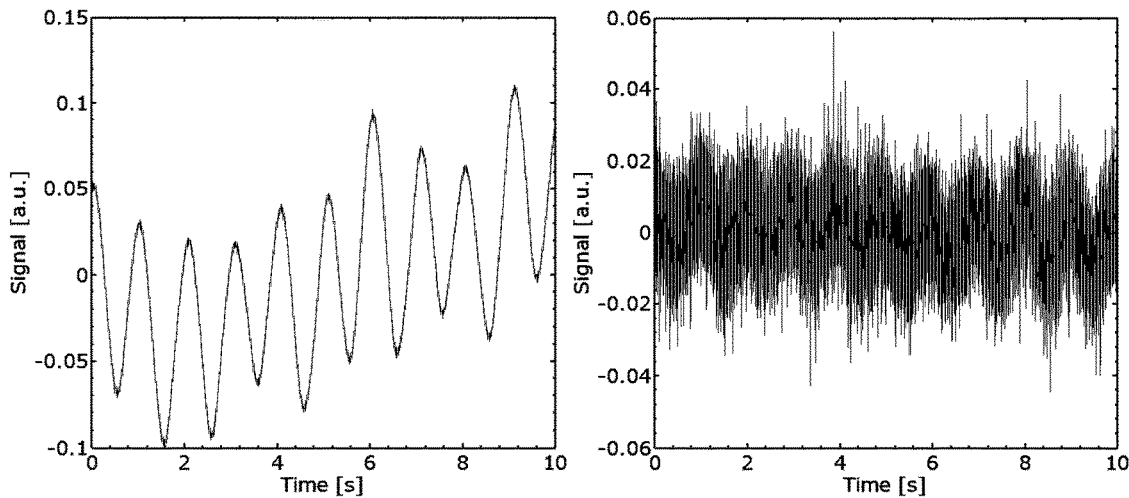
FIG. 17 shows the detector signal obtained with a device made according to FIG. 6 under 0.4 W/m² 1550 nm illumination modulated with a sinewave. On plot (a) a time trace obtained using the noise suppression technique according to Embodiment 3 at a sinusoidal bottom gate modulation of 113 Hz ($V_{BD}$ was oscillated around offset value 3.07 V with maximum 3.211 V and minimum 2.929 V) is shown, while plot (b) shows a time trace obtained using conventional read-out at a constant bottom gate voltage of 0 V. The same read-out bandwidth of 1.25 Hz has been used for obtaining both plots.

FIG. 9 described above shows that the peak at $f_m$ appears when light is shone. It does not prove yet that the noise suppression works. To prove this, experimental results are provided in FIGS. 17 and 18, which shows that the noise suppression actually functions according to Embodiment 3.

Specifically, a device with the structure depicted in FIG. 6 has been made. The local gate was made of nickel, the dielectric layer was 50 nm $Al_2O_3$ and the source and drain electrodes were made of palladium. Graphene was transferred and patterned into a W×L=30×60 μm² channel followed by deposition of a sensitizing layer of PbS colloidal quantum dots.

The signal on the detector was read in two different ways:
1. Noise suppression according to Embodiment 3: a sinusoidal gate modulation ($V_{BD}$ was sinusoidally oscillated around offset value 3.07 V with maximum 3.211 V and minimum 2.929 V) was applied to modulate the charge carrier density around the neutrality point between the drain electrode D and the bottom gate electrode structure Gb of $f_m$=113 Hz and a constant voltage bias to the source-drain electrodes. Light was shone on the detector and the source drain current was read with a lock-in amplifier with a bandwidth of 1.25 Hz while modulating the light impinging on the sensor with a frequency of 1 Hz (this light modulation was only applied to illustrate better the noise suppression). FIG. 17(a) shows the resulting signal.
2. Conventional read-out: a constant voltage of 0 V was applied between the bottom gate electrode structure Gb and drain electrode D (this is the setting for maximized photo response) and a constant source drain bias. The signal was read using a current amplifier and make sure that the output signal is limited by the noise of the detector. The resulting data is plotted in FIG. 17(b).

By comparing FIG. 17(a) with FIG. 17(b) it is clearly visible that the technique described in Embodiment 3 reduces the noise significantly.

Figure 18:
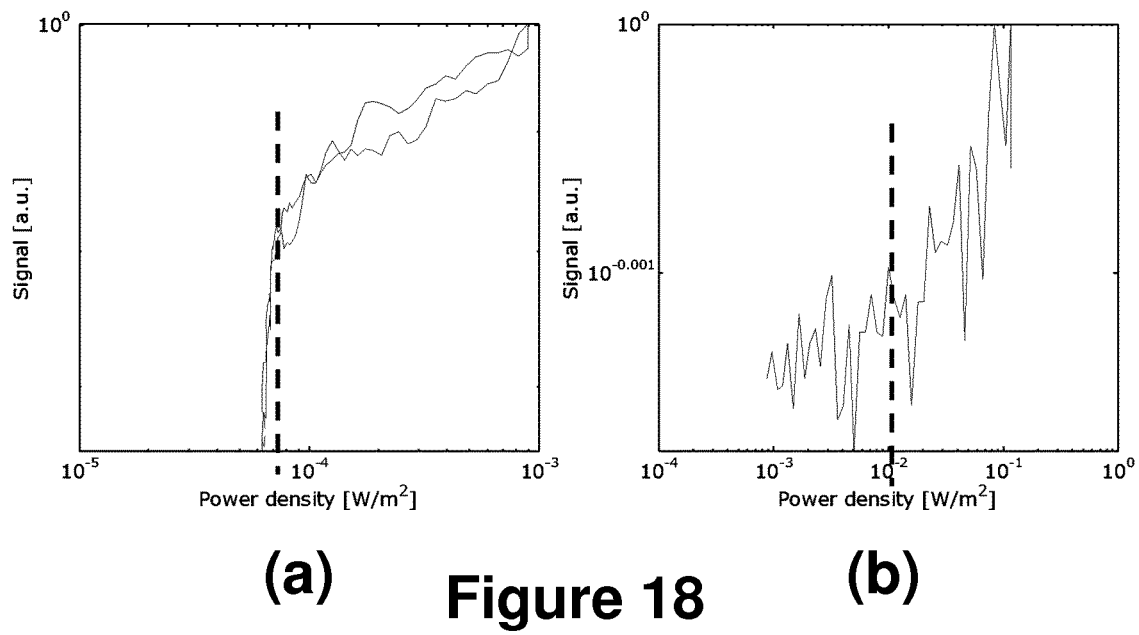
FIG. 18 shows, for the same detector made for obtaining the plots of FIG. 17, measurements of the noise equivalent irradiance using the noise suppression technique of Embodiment 3 (a) and with the conventional read-out (b). With the noise suppression technique a noise equivalent irradiance of 80 µW/m² is obtained, while with the conventional read-out only 10 mW/m² are obtained. This is an improvement of a factor 125.

To get a quantitative insight in the noise reduction a measurement of the noise equivalent irradiance was performed with the made device, as shown in FIG. 18, applying the noise suppression technique of Embodiment 3 (FIG. 18(a)) and with the conventional read out (FIG. 18(b)). As shown in that figure, noise was reduced the by a factor 125. Note that the noise suppression theoretically would provide a factor $\sqrt{113}$=10.6 suppression, hence there is another benefit of modulating the carrier density of the transport channel around the neutrality point.

Figure 19:
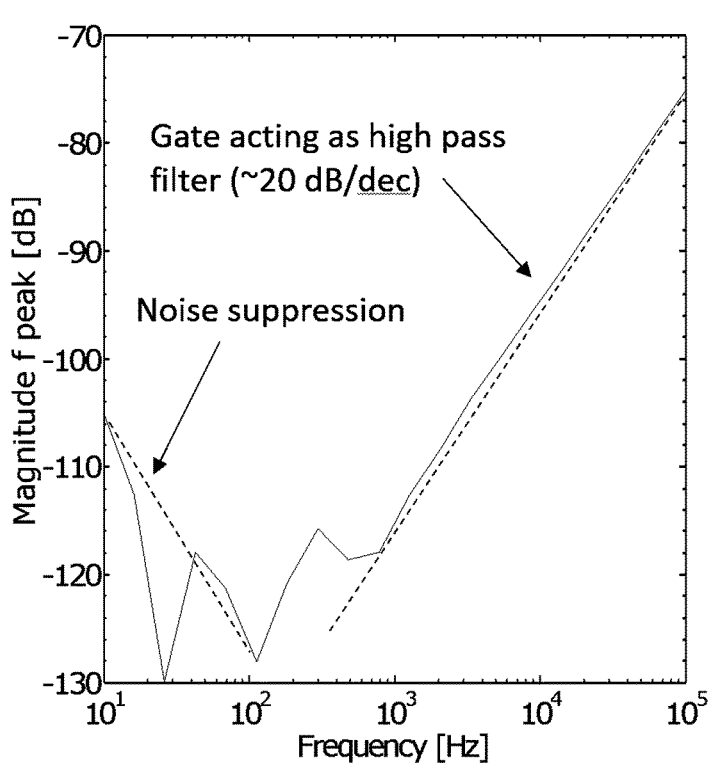
FIG. 19 shows, for the same detector made for FIGS. 17 and 18, the magnitude of the signal obtained in dark conditions at $\omega_m/2\pi$, i.e. $f_m$, as a function of modulation frequency $\omega_m/2\pi$, $f_m$, according to Embodiment 3. The band pass filter was set to a bandwidth of 1.25 Hz around the modulation frequency. The dashed lines are guides to the eye.

To further prove that the suppression of the 1/f noise as described in Embodiment 3, the dataset plotted in FIG. 19 has been also collected from a further made device according to the structure of FIG. 6. FIG. 19 clearly shows that the magnitude of the signal (which is the magnitude of the noise as this measurement was performed under dark conditions) reduces with increasing the modulation frequency until ~100 Hz. Above 100 Hz the signal increases again, this is due to the fact that the bottom gate electrode structure Gb and dielectric structure De act as a high pass filter (with a gate capacitance of about 2 pF) for the modulated signal applied to the bottom gate electrode structure Gb. A smaller gate capacitance would widen the modulation frequency regime in which the noise suppression works and thus increase the effectiveness of the noise suppression.

Embodiment 4: Source Drain Voltage Modulation for Noise Suppression

Figure 11:
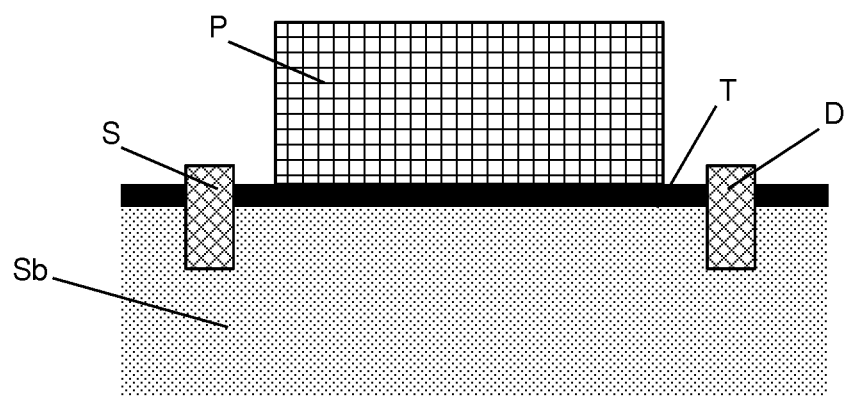
FIG. 11 is a schematic cross-sectional view of the optoelectronic device of the apparatus of the first aspect of the present invention for an alternative arrangement to that shown in FIG. 6, but which can also be used for the fourth embodiment.

For this Embodiment 4, the optoelectronic device of the optoelectronic apparatus of the first aspect of the present invention also has the arrangement depicted by FIG. 6 or the one depicted by FIG. 11.

Figure 10:
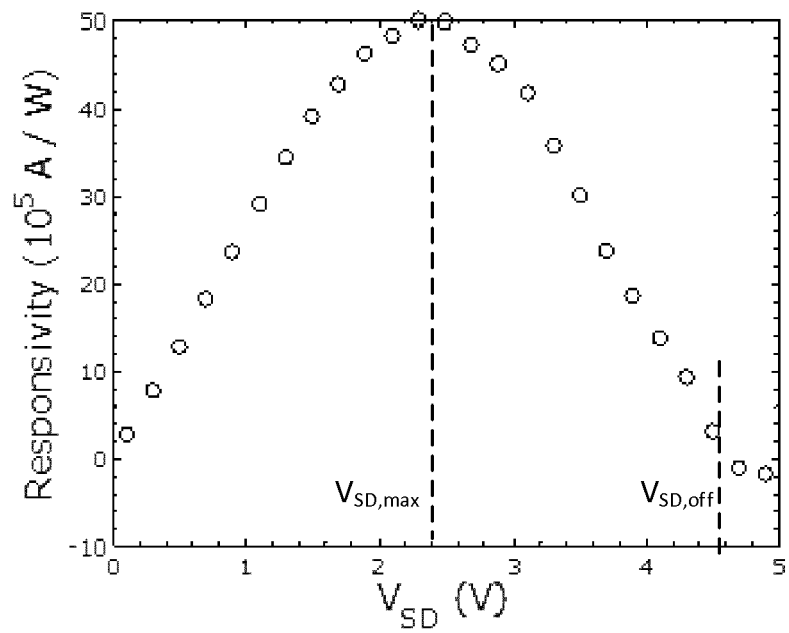
FIG. 10 is a plot which shows the responsivity of the optoelectronic device of the apparatus of the present invention, as a function of source drain bias at a constant irradiance of 50 mW/m$^2$, for a fourth embodiment.

In this case, noise suppression is implemented by modulating the source drain bias, based on the observation that the photoresponse can be switched off by applying a large source drain bias $V_{SD,off}$ such that the response of the detector is 0 (or substantially 0). FIG. 10 shows this effect.

Therefore, the bias between $V_{SD,max}$ (or $V_{SD,1}$) (source drain bias for which the responsivity is maximal) and $V_{SD,off}$ (or $V_{SD,2}$) can be modulated according to the present invention to implement a built-in shutter for the device.

Such shutter can be implemented using a voltage oscillating signal with frequency tom to be applied to the source S and drain D electrodes, for example a sinusoidal signal (or any other periodic signal square pulse, triangular wave, etc. . . . ):

$$V_{SD}=0.5*abs(V_{SD,off}-V_{SD,max})*(1+\sin(\omega_m*t+\varphi))$$

The control unit (not shown) is configured to apply said voltage oscillating signal $V_{SD}$ between the source S and drain D electrodes, and to generate the same so that it oscillates between a higher value $V_{SD,off}$ at which responsivity of the optoelectronic device is zero or substantially zero, and a lower value $V_{SD,max}$ at which responsivity of the optoelectronic device is maximal or substantially maximal.

The responsivity of a prototype of the photodetector according to Embodiment 4 is shown in FIG. 10, as a function of source drain bias at a constant irradiance of 50 mW/m².

The read-out and signal extraction to suppress the noise in the final output signal can be implemented in the same way as in embodiment 1. The detector output waveforms before and after signal extraction will be the same or similar to the ones of FIG. 4, when a band pass filtering is applied.

Figure 12:
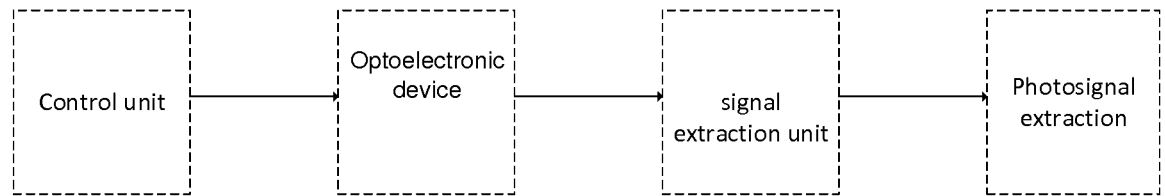
FIG. 12 schematically shows a full read-out chain implemented by the apparatus of the present invention, for an embodiment.

After generation of the output detection signal, i.e. the above called required electric signal, the actual photosignal needs to be extracted. In FIG. 12 below the full signal read-out chain is illustrated, for an embodiment, where, in addition to the already disclosed above control unit, optoelectronic device, and signal extraction unit, a further block is included in the apparatus of the present invention, particularly a photosignal extraction unit.

The photosignal extraction can be implemented in the following ways:
  Record a time trace of the output detection signal and measure the maximum $S_2$ and minimum $S_1$ of the output detection signal, then the magnitude of the photosignal is $S_2-S_1$.
  When a fast Fourier transform (FFT) is used for the filtering, as shown in FIG. 9, the magnitude of the photosignal is the value at frequency $f=\omega_m/2\pi$
  When a lock-in amplifier is used for the filtering, the photosignal is directly put out by the lock-in amplifier, i.e. the photosignal extraction unit depicted in FIG. 12 would be implemented by the signal extraction unit.
  Correlated double sampling type photosignal extraction, as described below for different embodiments.

For said embodiment for which a correlated double sampling type photosignal extraction is performed, the photo signal is obtained by subtracting the signal from the signal extraction unit for $V_{BD,1}$ (or $V_{SD,2}$, or $V_{TD,2}$) from the signal for $V_{BD,2}$ (or $V_{SD,1}$, or $V_{TD,1}$). The read-out versus time sequence can be implemented in the following way in case the time dependent signal is a square wave:
  1: Apply a voltage with value $V_{BD,1}$ (and/or $V_{SD,2}$, and/or $V_{TD,2}$)
  2: Read the magnitude of output detection signal, this is value $S_2$, store $S_2$
  3: Apply a voltage with value $V_{BD,2}$ (and/or $V_{SD,1}$, and/or $V_{TD,1}$)
  4: Read the magnitude of the output detection signal, this is value $S_1$, store $S_1$. $S_2-S_1$ gives the magnitude of the photosignal Signal $S_1$ and $S_2$ can be for example a current or a voltage.

Figure 13A:
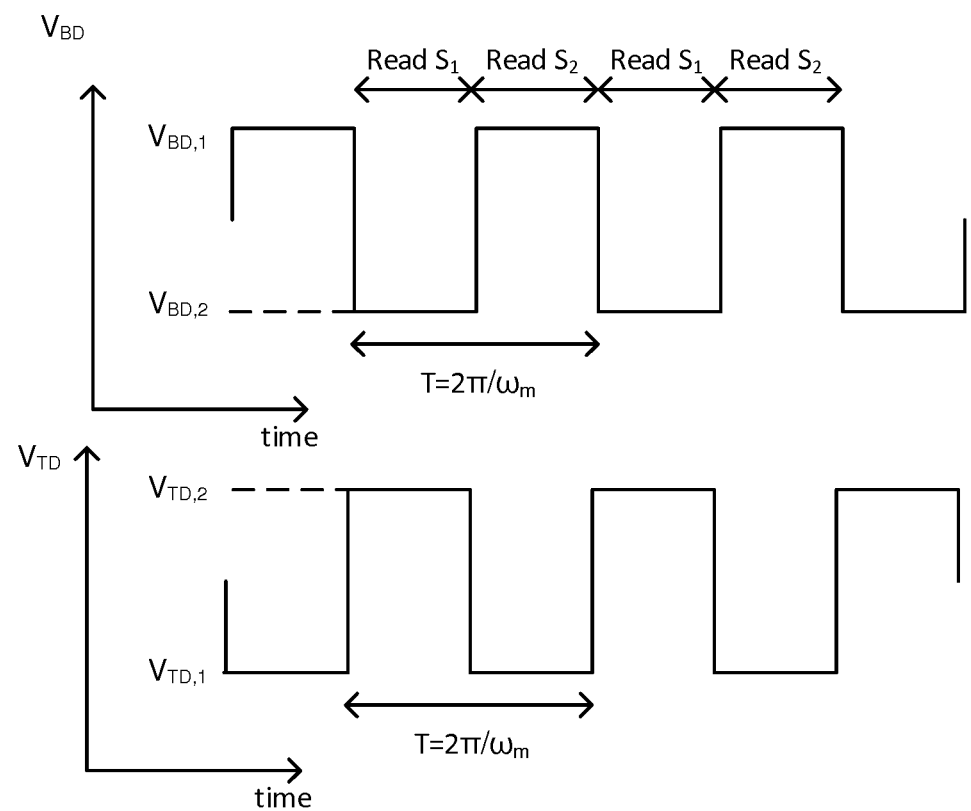
FIG. 13a shows a correlated double sampling timing sequence performed at the photosignal extraction unit of FIG. 12, for some implementations of embodiments 1, 2 and 3 described below.

In FIG. 13a the correlated double sampling timing sequence described above, but specifically for embodiments 1, 2 and 3 is illustrated. If there is no top gate implemented in the device structure, the $V_{TD}$ sequence can be ignored.

Figure 13B:
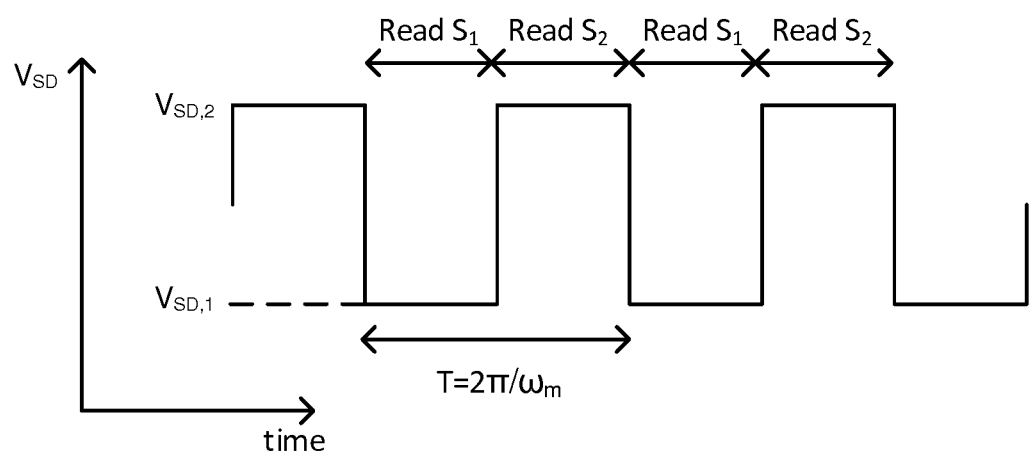
FIG. 13b shows a correlated double sampling timing sequence performed at the photosignal extraction unit of FIG. 12, for some implementations of embodiment 4 described below.

In FIG. 13b the correlated double sampling timing sequence described above, but specifically for embodiment 4 is illustrated.

Figure 14:
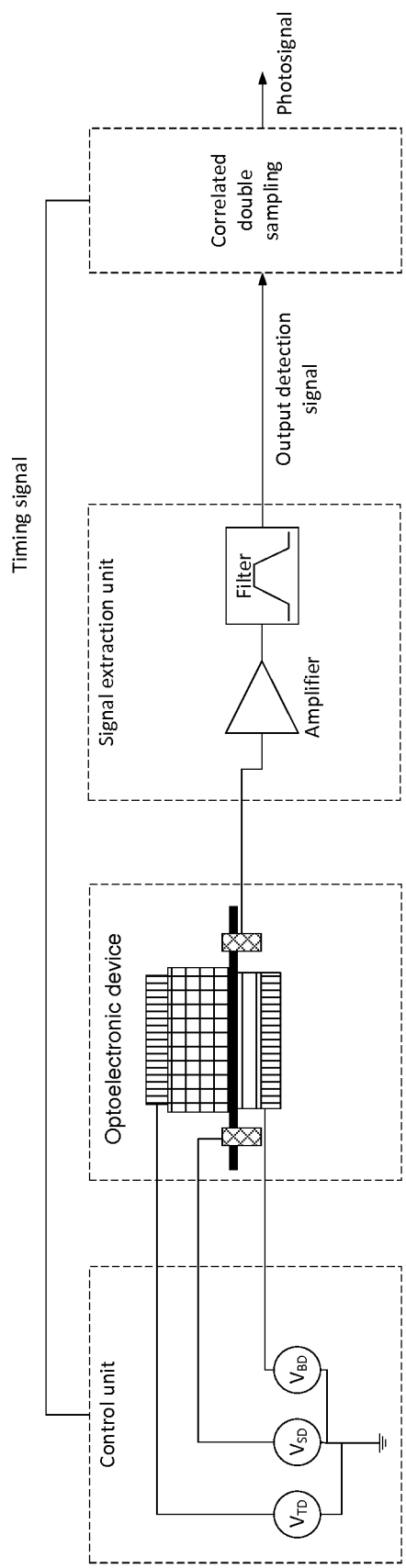
FIG. 14 illustrates an example implementation of the apparatus of the present invention implementing the full read-out chain of FIG. 12 for some implementations of embodiments 1 and 2 using a correlated double sampling as photosignal extraction method.

FIG. 14 illustrates an example implementation of the apparatus of the present invention implementing the full read-out chain of FIG. 12 for embodiments 1 and 2 using the above described correlated double sampling as photosignal extraction method.

Note that although in FIG. 14 the output electric signal goes directly from the optoelectronic device to the signal extraction unit, for other embodiments (not illustrated) that's not the case, for example when a balanced read-out scheme is implemented.

A person skilled in the art could introduce changes and modifications in the embodiments described without departing from the scope of the invention as it is defined in the attached claims.

The invention claimed is:

1. An optoelectronic apparatus, comprising an optoelectronic device comprising:
  a transport structure comprising at least one 2-dimensional layer;
  a photosensitizing structure configured and arranged to absorb incident light and induce changes in the electrical conductivity of the transport structure; and
  drain and source electrodes electrically connected to respective separate locations of said transport structure;
  wherein the optoelectronic apparatus further comprises noise suppression means comprising a modulation unit including:
  a control unit which includes a voltage generator and is configured to generate a voltage oscillating time-dependent signal having at least one component with a frequency of $f_m$, and apply the same at least on one of said drain and source electrodes; and
  a signal extraction unit configured to extract a required electric signal from an output electric signal generated at a channel created in said transport structure between said drain and source electrodes upon light impinges on said photosensitizing structure, said signal extraction unit being adapted to cut out at least those components of said output electric signal at frequencies below $f_m$ to provide said required electric signal,
  wherein said optoelectronic device further comprises a conductive first gate electrode structure, and a dielectric structure arranged between said conductive first gate electrode structure and said transport structure, and wherein said control unit is configured to apply said voltage oscillating time-dependent signal between said conductive first gate electrode structure and at least one of said drain and source electrodes.

2. The optoelectronic apparatus according to claim 1, wherein said conductive first gate electrode structure is a conductive bottom gate electrode structure.

3. The optoelectronic apparatus according to claim 1, wherein said control unit is configured to apply said voltage oscillating time-dependent signal between said conductive first gate electrode structure and said drain electrode.

4. The optoelectronic apparatus according to claim 3, wherein said at least one 2-dimensional layer is made of graphene, and wherein said control unit is configured to generate said voltage oscillating time-dependent signal so that it oscillates between maximum and minimum voltage values which are equal in magnitude but with opposed signs and selected by the control unit so that charge carrier density of said channel is modulated around the charge neutrality point of the graphene between maximum and minimum charge carrier density values at at least a frequency $f_m$, and the conductivity of the graphene layer is modulated at a frequency $2f_m$ and contains a component at a frequency $f_m$ when light impinges on the photosensitizing structure.

5. The optoelectronic apparatus according to claim 4, wherein said maximum and minimum charge carrier density values are of opposite signs.

6. The optoelectronic apparatus according to claim 5, wherein the absolute values of the maximum and minimum charge carrier density values are equal or substantially equal in magnitude.

7. The optoelectronic apparatus according to claim 4, wherein the maximum and minimum charge carrier density values are residual charge carrier density values.

8. The optoelectronic apparatus according to claim 4, wherein the optoelectronic device further comprises:
   a further electrode electrically connected to said photosensitizing structure; or
   a further dielectric structure arranged over said photosensitizing structure, and a conductive second gate electrode structure arranged over said further dielectric structure,
   and wherein the control unit is configured to generate and apply a further voltage signal to said further electrode or second gate electrode structure, simultaneously to the application of said voltage oscillating signal, so that the responsivity of the optoelectronic device is maintained constant and above zero.

9. The optoelectronic apparatus according to claim 8, wherein the control unit is configured to generate and apply said further voltage signal to the further electrode or second gate electrode structure, so that the responsivity of the optoelectronic device is maintained constant at a maximum or substantially maximum value.

10. The optoelectronic apparatus according to claim 9, wherein the control unit further comprises a compensation mechanism for compensating dependencies of the responsivity of the optoelectronic device on the voltage oscillating time-dependent signal or other voltages applied to the conductive first gate electrode structured, said compensation mechanism comprising a compensating voltage source configured to generate and apply a compensating voltage to the further electrode or second gate electrode structure.

11. The optoelectronic apparatus according to claim 3, wherein said at least one 2-dimensional layer is made of graphene, and wherein said control unit is configured to generate said voltage oscillating time-dependent signal so that it oscillates between maximum and minimum voltage values which are equal or substantially equal in magnitude, with respect to a reference, of the same sign when there is a carrier density offset in said channel, and selected by the control unit so that charge carrier density of said channel is modulated around the charge neutrality point of the graphene between maximum and minimum charge carrier density values at at least a frequency $f_m$, and the conductivity of the graphene layer is modulated at a frequency $2f_m$ and contains a component at a frequency $f_m$ when light impinges on the photosensitizing structure.

12. The optoelectronic apparatus according to claim 1, wherein the optoelectronic device further comprises a further electrode electrically connected to said photosensitizing structure, and wherein said control unit is configured to generate a further voltage oscillating time-dependent signal having at least one component with a frequency of $f_m$, and apply the same between said further electrode and one of said drain and source electrodes, simultaneously to the application of the voltage oscillating time-dependent signal.

13. The optoelectronic apparatus according to claim 12, wherein the control unit is configured to generate said voltage oscillating time-dependent signal and said further voltage oscillating time-dependent signal so that they oscillate between maximum and minimum voltage values selected by the control unit to maintain substantially constant the charge carrier density of said channel while tuning the responsivity of the optoelectronic device from a finite value, at said maximum voltage values, to zero, at said minimum voltage values, and vice versa.

14. The optoelectronic apparatus according to claim 12, wherein said voltage oscillating time-dependent signal and said further voltage oscillating time-dependent signal are phase shifted up to 180°.

15. The optoelectronic apparatus according to claim 1, wherein the optoelectronic device further comprises a further dielectric structure arranged over said photosensitizing structure, and a conductive second gate electrode structure arranged over said further dielectric structure, and wherein said control unit is configured to generate a further voltage oscillating time-dependent signal having at least one component with a frequency of $f_m$, and apply the same between said conductive second gate electrode structure and one of said drain and source electrodes, simultaneously to the application of the voltage oscillating time-dependent signal.

16. The optoelectronic apparatus according to claim 15, wherein said conductive second gate electrode structure (Gt) is a conductive top gate electrode structure.

17. The optoelectronic apparatus according to claim 1, comprising a photosignal extraction unit, in addition to or implemented by the signal extraction unit, adapted to extract the magnitude of the photosignal from the required electric signal.

18. An optoelectronic apparatus, comprising an optoelectronic device comprising:
   a transport structure comprising at least one 2-dimensional layer;
   a photosensitizing structure configured and arranged to absorb incident light and induce changes in the electrical conductivity of the transport structure; and
   drain and source electrodes electrically connected to respective separate locations of said transport structure;
wherein the optoelectronic apparatus further comprises noise suppression means comprising a modulation unit including:
   a control unit which includes a voltage generator and is configured to generate a voltage oscillating time-dependent signal having at least one component with a frequency of $f_m$, and apply the same at least on one of said drain and source electrodes; and
   a signal extraction unit configured to extract a required electric signal from an output electric signal generated at a channel created in said transport structure between said drain and source electrodes upon light impinges on said photosensitizing structure, said signal extraction unit being adapted to cut out at least those components of said output electric signal at frequencies below $f_m$ to provide said required electric signal, and
wherein said control unit is configured to apply said voltage oscillating time-dependent signal between said drain and source electrodes, and to generate the same so that it oscillates between a higher value at which responsivity of the optoelectronic device is zero or substantially zero, and a lower value at which responsivity of the optoelectronic device is maximal or substantially maximal.

19. The optoelectronic apparatus according to claim 18, comprising a photosignal extraction unit, in addition to or implemented by the signal extraction unit, adapted to extract the magnitude of the photosignal from the required electric signal.

20. A method for suppressing noise for an optoelectronic apparatus comprising an optoelectronic device comprising:
- a transport structure comprising at least one 2-dimensional layer;
- a photosensitizing structure configured and arranged to absorb incident light and induce changes in the electrical conductivity of the transport structure; and
- drain and source electrodes electrically connected to respective separate locations of said transport structure;

wherein the optoelectronic apparatus further comprises noise suppression means comprising a modulation unit including:
- a control unit which includes a voltage generator and is configured to generate a voltage oscillating time-dependent signal having at least one component with a frequency of $f_m$, and apply the same at least on one of said drain and source electrodes; and
- a signal extraction unit configured to extract a required electric signal from an output electric signal generated at a channel created in said transport structure between said drain and source electrodes upon light impinges on said photosensitizing structure, said signal extraction unit being adapted to cut out at least those components of said output electric signal at frequencies below $f_m$ to provide said required electric signal;

wherein said optoelectronic device further comprises a conductive first gate electrode structure, and a dielectric structure arranged between said conductive first gate electrode structure and said transport structure, and wherein said control unit is configured to apply said voltage oscillating time-dependent signal between said conductive first gate electrode structure and at least one of said drain and source electrodes;

wherein the method comprises performing the operations of said control unit, including calculating said voltage oscillating time-dependent signal, and the application thereof on the respective electrode(s) and/or gate electrode structure(s) of the optoelectronic device, and the operations of said signal extraction unit to extract said required electric signal from said output electric signal.

* * * * *